Feb. 22, 1927. A. C. FISCHER Re. 16,554
ELASTIC AND EXPANSIBLE PAVING JOINT
Original Filed July 3, 1920
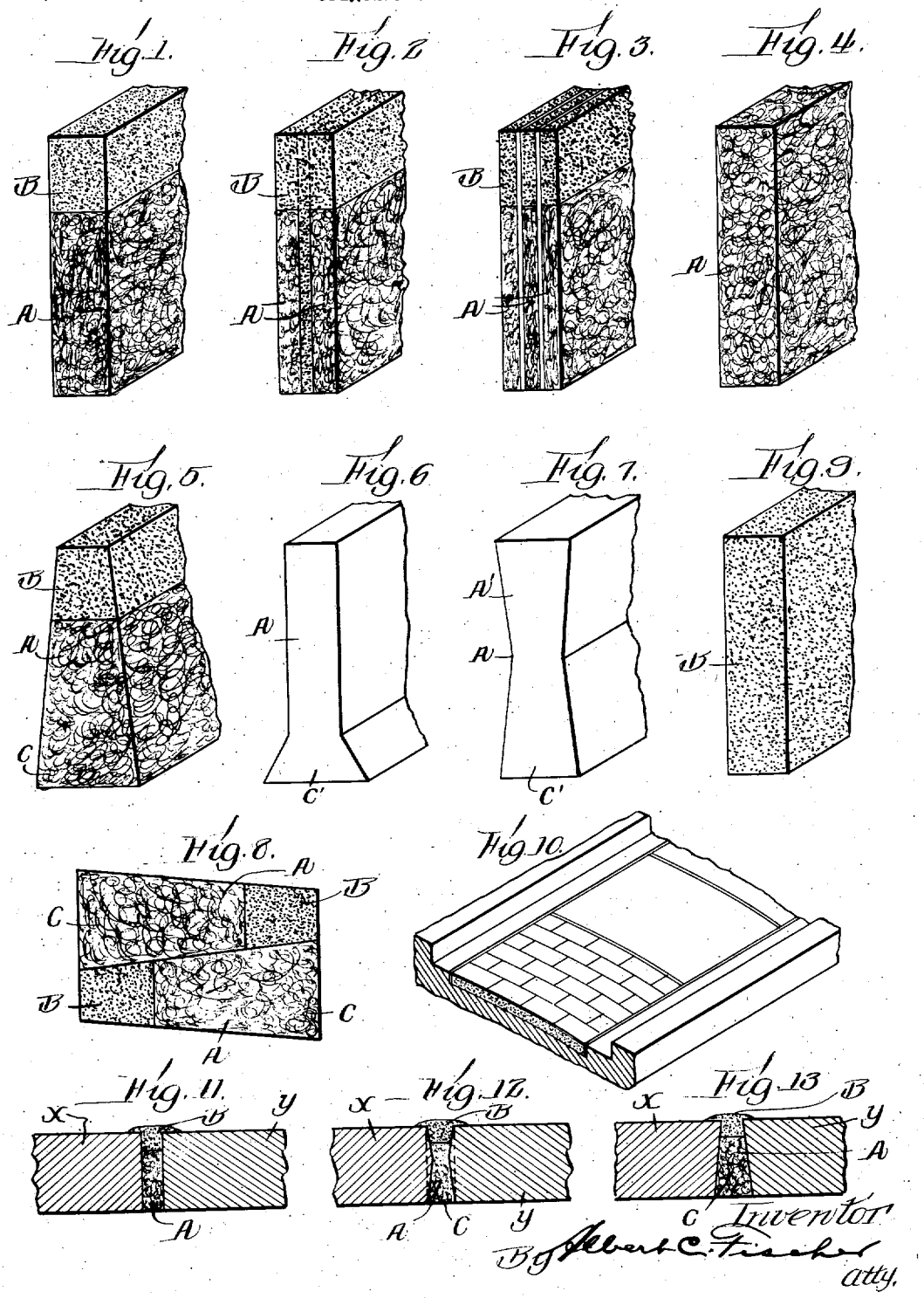
Inventor
By Albert C. Fischer
Atty.

Reissued Feb. 22, 1927. Re. 16,554

UNITED STATES PATENT OFFICE.

ALBERT C. FISCHER, OF CHICAGO, ILLINOIS.

ELASTIC AND EXPANSIBLE PAVING JOINT.

Original No. 1,503,942, dated August 5, 1924, Serial No. 393,801, filed July 3, 1920. Application for reissue filed August 3, 1926. Serial No. 126,909.

My invention relates to improvements in means permitting expansion and compensating for contraction of street paving. Heretofore it has been the practice to use, between sections of paving, an asphaltic filler or one built up in layers of asphaltic material placed between layers of saturated felt, or a mastic body of felt compounded and saturated with a waterproofing material which was constructed in slabs or board-like strips, to be placed between bricks, curbs, concrete blocks and other structural material.

One difficulty experienced in the use of many of these expedients has been that when the strip is laid in the fall, or if through any chance frost finds its way under the strip, the strip will be raised, sometimes as much as several inches, and in some instances almost entirely expelled by the frost under the concrete. This is made possible by the fact that when the concrete contracts the material of the joint does not expand to the width of the opening in which it was first inserted. The result is that considerable of the material is lost and its purpose defeated. Moreover, the volatile oils with which the joint is saturated leave the waterproofing material, so that it deteriorates to a hard, brittle, and dried out condition and no longer has the elastic effect which it had when first installed. Under such conditions the felt even deteriorates and rots, leaving a powdery substance in its place. This is due to the fact that the street often reaches a temperature as high as 140 degrees at which considerable of the volatile oils in the asphaltic material necessarily evaporate, the felt being a great conserver of heat and the asphaltic material saturated therein holding heat considerably longer than the concrete or paving material does. Another condition to be met is that when the concrete paving expands it often squeezes out the contents of the joint, and traffic wears it away until the material which was originally used as a filler no longer fills up the space which was at first occupied by the joint, and weather and elements are free to enter.

My invention consists in an expansion joint having a flow retarding homogeneous reinforcement comprising a felted mat with interlocking fibres, such as mineral wool, asbestic fibre, or the like, having insulating properties and which is proof against street acids and rotting processes, saturated in a waxy or paraffinous waterproofing compound and thoroughly compressed into a block-like structure, preferably wedge shaped with the base of the wedge at the bottom of the strip, the upper part of the strip or slab being further immersed in an asphaltic waterproofing compound which gives it a solid but pliant consistency for several inches downward from the top of the joint, leaving the base light in weight and composed only of the fibres coated and compressed with a waterproofing material, which is light in structure and yields by compression to pressure from below instead of rising out of its seat, and thus remains in place under the adverse conditions of use. I thus create a joint which is less than half the weight of the solid joint as now being placed upon the market, and more durable in use than such joint. My improved paving joint, under the conditions named, will wedge more tightly into place instead of working out. It is constructed of material which is resistant to temperatures of the hottest possible weather, and it provides a plastic asphaltic top to the joint which will close and seal the top of the joint space, presents a wearing surface to the traffic, and, under pressure, will be pressed into the crevice and adapt itself to the top opening thereof. Upon expansion of the concrete or paving material, the joint will not ooze out, but by reason of its insulating nature will retain a non-fluid state.

In order that the invention may be fully understood, several embodiments thereof are disclosed, by way of illustration, in the accompanying drawings.

In said drawings:—

Figure 1 represents a joint packing of rectangular section made of fibrous material, with a crown thoroughly immersed in asphaltic material while hot, giving it a tough wearing surface and sealing head.

Figure 2 shows a joint packing composed of fibrous material along the sides of a saturated piece of felt and with a crown of asphaltic fibrous material giving firmness to the joint.

Figure 3 shows a joint packing comprising built-up layers of dried fibrous material saturated with light waterproofing material and having a crown of heavy waterproofing.

Figure 4 shows a joint packing comprising an entire fibrous body immersed in a light waterproofing material, which does not add materially to its weight.

Figure 5 shows joint packing of wedge shaped section, having a crown of solid asphaltic matter which has been absorbed by the porous body of the fibrous matter.

Figure 6 shows a section with flaring base to prevent working up of the joint.

Figure 7 shows a joint packing having a double wedge section which prevents the working up of the joint without developing any overhang in the concrete or weakening the thickness of the paving on either side.

Figure 8 shows how wedge shaped joint packings may be packed without causing the bituminous matter on the crowns to adhere together.

Figure 9 shows a solid fibrous block entirely immersed in a solid asphalt while hot, giving to the block a touch, compact, fibrous consistency when cool.

Figure 10 shows concrete, brick, or block paving with joints embodying the subject-matter of the present invention disposed along the sides.

Figure 11 shows the joint between two construction surfaces and illustrates how the crown adapts itself to the top of the crevice, the resiliency of the base allowing the crown to spring down and lock with the pressure of the traffic, yet presenting a wearing surface to the traffic.

Figure 12 illustrates the form of Figure 7 in use; and

Figure 13 represents the form of Figure 5 in use.

In all the figures, A represents the body of the packing which is made of asbestos, mineral wool, or equivalent light fibre, meaning any light fibre having length giving thereto interlockability, as distinguished from granular substances such as cork, sand, tan-bark, which act as fillers merely and have no inherent properties in building up the joint structure, felted together and saturated with paraffin, or its equivalent, for the purposes hereinabove described. The body will be formed of a section suitable to fill the space between paving members X, Y, Figures 11, 12, and 13, of such thickness that it can yield to the approach of the paving members when they expand under heat, and of such inherent elasticity that it will expand and continue to fill the packing space even though the paving members draw apart under contraction. The body is also such that pressure exerted vertically upon it, from either below (as in case of frost) or above (as from traffic) will be absorbed in the inherent compressibility of the body instead of displacing the body.

The head or upper portion B is immersed in asphaltic material of such consistency as to provide a substantial pliable envelope, and render the upper portion compressible and ductile to the extent of adapting itself to the packing opening, filling and sealing the same, and spreading out and presenting a resistant portion of the street surface under the traffic which it encounters.

The body preferably has its side lines so developed that it enlarges downwardly from some transverse line or lines in its section so as to present an enlargement that resists expulsion of the packing under vertical pressure. This may be accomplished by making the wedging sections of Figures 5, 8, and 13, or the flaring lower end of Figure 6, and the taper may be developed from both top and bottom toward the middle as shown in Figures 7 to 12 to resist vertical displacement in either direction. With the wedging lines, vertical pressure tends to tighten the packing in its seat.

Under the pressure of traffic, the asphalt-enveloped head spreads as suggested in Figures 11, 12, and 13, seals the joint, and presents a tough wearing surface to traffic.

From the foregoing it will be seen that the surface of my new joint will meet the unusual condition which is demanded of it, will always present a filling for the crevice, and will not be subject to the conditions that a solid asphaltic or board-like felt joint is subject to. While of fibrous nature, it is not subject to rotting process. The shape of the joint and its inherent structure save it from the fluid consistency which an asphaltic joint has.

The great value of my improved expansion joint, as differing from the expansion joints disclosed in the prior art, resides in the internal structure of interlocked fibres, which form an internal mat structure within the joint, which adds strength, body, and resists and flowing of the binder, and which is of such a structure that it will stand up as a fibre mat even after the binder has been removed therefrom.

To avoid any possible confusion in the foregoing description, as to the meaning of the term saturated, I wish to call attention to the fact that I have not used this term—saturated—to convey the idea that the fibres of the mineral wool or asbestos are saturated. As a matter of fact, it would be impossible to saturate mineral wool or asbestos fibres, but when the same are felted, the interstices formed by the loosely matted fibres may perhaps be filled so that the filled structure becomes saturated. By simply loosely felting the fibres into a block-like structure, I am able to fill the mass with the water-proofing substance so that a great many of the fibres are separated one from the other by a substantial thickness of waterproofing material. In the event that I would desire to produce a very much lighter structure, I would use the waterproofing substance in a very much thinner consistency so that the surplus would drain off and thus leave unfilled interstices between the fibres. This would give me a cellular structure. Should I desire to produce a cellular structure but with the fibres more closely compacted, I would express the surplus saturant and thus leave a cellular structure with the fibres more closely compacted.

I have discovered that mineral wool fibres are cellular consequently I think it best to make some distinction between a structure in which the cells are derived from leaving interstitces between the fibres when same are felted and a structure in which the fibres themselves are cellular. In this connection, I call attention to the fact that by using mineral wool fibres which are cellular I may still produce a cellular structure and at the same time fill the interstices between the fibres in the matted mass. On the other hand, if I did not fill the interstices between the fibres and the matted mass I would increase the cells in the structure so that a very highly compressible matted structure would be produced. With these conclusions it will be seen that by using mineral wool and a goodly quantity of waterproofing substance such as asphalt, I can produce a more or less solid structure and at the same time take advantage of the cells in the mineral wool to develop a more or less high degree of compressibility and expansibility. On the other hand, by using a very light waterproofing saturant, I can increase this compressibility and expansibility by simply matting the fibres together and leaving the interstices to develop the cell structure and also take advantage of the cell in the fibres themselves.

I claim:

1. An expansion joint comprising a matlike felted strip of fibrous material having a waterproof crown along an edge thereof.

2. An expansion joint composed of compressible mineral fibrous matter having cells or pores, and having the upper portion thereof composed of a substantially solid mass of asphaltic or bituminous substance penetrated into the fibrous structure and forming thereon a solid non-fluid head.

3. A packing for paving joints, composed of fibrous material coated with a relatively light waterproofing material which does not add materially to its weight, said coated fibrous material being felted into a cellular mass.

4. A packing for paving joints, composed of fibrous material coated with a relatively light waterproofing material which does not add materially to its weight, said coated fibrous material being felted into a plurality of layers of cellular structure, and said layers being assembled in the packing.

5. A packing for paving joints, comprising felted fibrous material built up in layers, immersed in a waterproofing material, and having a crown consisting of heavy asphaltic material.

6. A packing for paving joints comprising a heavy saturated felt with sides of lightly felted fibrous material, waterproofed and crowned with a solid asphaltic material.

7. A fibrous material waterproofed with a waterproofing substance which does not add materially to its weight, and having a crown of bituminous matter imparting a tough resilience to the crown.

8. A mineral fibrous matter lightly pressed into an air cell structure, adhered with a waxy or paraffinous waterproofing material which does not add materially to its weight.

9. A joint packing consisting of fibrous material formed into a light cellular structure, and having a portion thereof jacketed with a ductile substance that renders it tough and resilient.

10. A joint paving constructed of a compressive body and felted fibrous material adapted to enter between sections of paving and having its portion which is adjacent to the surface of the paving when in use, filled with asphaltic or bituminous substance which converts it into a substantially solid mass.

11. A preformed strip of expansion joint, comprising a mixture of interlocking fibres and a waterproof binder, said fibres being coated by the binder and compacted into a cellular strip, the cells in said strip existing between the coated fibres.

12. A composite expansion joint in preformed form comprising interlocked fibres coated by a waterproof binder, air spaces being formed between the coated fibres.

13. A preformed expansion joint, the main body of which comprises a single, homogeneous mass of interlocking fibres, said fibres having been previously coated with a waterproofing material.

14. A preformed wedge shaped expansion joint, the main body of which comprises a single, homogeneous mass of interlocking fibres, said fibres having been previously coated with a waterproofing material.

15. A preformed expansion joint, the main body of which comprises a single, homogeneous mass of interlocking fibres, said fibres having been previously coated with a waterproofing material, said joint having a coating of a hard waterproofing material.

16. A preformed expansion joint, the main body of which comprises a single, homogeneous mass of interlocking fibres pressed into a block-like structure, said fibres having been previously coated with a waterproofing material.

17. A preformed expansion joint, the main body of which comprises a single, homogeneous mass of interlocking fibres, said fibres having been previously saturated and coated with a waterproofing binder.

18. A preformed wedge shaped expansion joint, the main body of which comprises a single, homogeneous mass of interlocking fibres, said fibres having been previously coated with a waterproofing material, said joint having a tough ductile crown.

19. A preformed expansion joint, the main body of which comprises a single, homogeneous mass of interlocking fibres, said fibres having been previously coated with a waterproofing material, said joint having a tough waterproofing crown.

20. A preformed expansion joint, the main body of which comprises a single, homogeneous mass of interlocking fibres, said fibres having been previously coated with a waterproofing material, said joint being made up in layers.

ALBERT C. FISCHER.